UNITED STATES PATENT OFFICE.

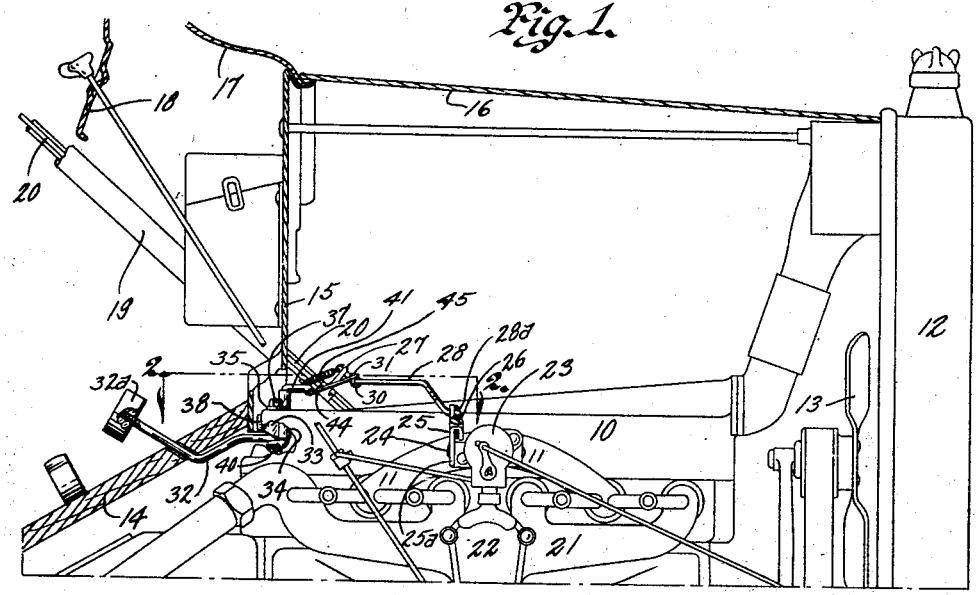

WALTER H. THOMAS, OF SPENCER, IOWA.

FOOT FUEL CONTROL FOR MOTOR VEHICLES.

Application filed January 25, 1926. Serial No. 83,601.

*To all whom it may concern:*

Be it known that I, WALTER H. THOMAS, a citizen of the United States, and a resident of Spencer, in the county of Clay and State of Iowa, have invented a certain new and useful Foot Fuel Control for Motor Vehicles, of which the following is a specification.

It is my purpose to provide a foot fuel control for motor vehicles of simple and inexpensive construction, which can be readily and easily mounted on an automobile, such for instance as a Ford, as an attachment, with a very little change in the parts found on the car, as sent from the factory.

It is a further object of my invention to provide a foot fuel control for the throttle valve of an automobile engine, which can be assembled on a car as an attachment in such a way as not to interfere with or modify the normal operation of the regular throttle control equipment and particularly in such a way as to impose no yielding tension on the ordinary hand throttle control mechanism of the kind which would tend to close the throttle.

With these and other objects in view, my invention consists in the construction, arrangement and combination of the various parts of my foot fuel control for motor vehicles, whereby the objects contemplated are attained, as hereinafter more fully set forth, pointed out in my claims, and illustrated in the accompanying drawings, in which:

Figure 1 shows a vertical, sectional view through the hood and cowl and dash of an instrument board of an automobile, illustrating part of the engine of the automobile in side elevation with my improved foot fuel control installed on the engine, part of the foot control being broken away and part being shown in section.

Figure 2 is a detail, sectional view taken on the line 2—2 of Figure 1.

Figure 3 is a perspective view of a foot fuel control alone; and

Figure 4 is a detail sectional view taken on the line 4—4 of Figure 2.

In the accompanying drawings, I have used the reference numeral 10 to indicate generally the engine of a Ford automobile having the intake manifold 11, radiator 12, fan 13, foot board 14, dash 15, hood 16, cowl 17, instrument board 18, steering post 19, hand throttle control rod 20 and exhaust manifold 21.

I have illustrated the engine as equipped with a carburetor 22 of the type having the fuel passage 23 to the intake manifold.

In the fuel passage is the ordinary throttle valve, not shown, having the stem 24 to which is fixed the throttle stem control lever 25. Mounted on the lever 25 is an adjusting screw 26 adapted to engage the intake manifold 11 for limiting the movement of the lever in one direction.

The lever 25 has an extended end 25$^a$ for engaging the same manifold for limiting the lever movement in the opposite direction.

I provide with my foot feed control an arm 27, which is fixed on the hand throttle control rod, as shown. I connect with the arm 27 a transverse rod 28.

The rod 28 has at one end a portion bent at an angle to its body, as at 28$^a$, and extended through a hole in the lever 25. At the other end of the rod, the rod is provided with spaced stops. For instance, I extend through the extreme end of the rod the cotter pin 29 and mount on the rod at a distance properly spaced from the cotter pin, the collar 30, which is adjustably locked in position by means of a set screw 31.

Slidably mounted in the inclined foot board 14 is a foot actuatable rod 32 having screwed on to its upper, rear end a head 32$^a$, which can thus be readily removed.

I provide a bracket, comprising the plate 33, which in installed position is upright, having in one side edge a portion rolled to form a bearing or journal 34, and having at its upper edge a vertical flange 35 provided with an opening or slot or the like 36 to receive one of the cylinder head bolts 37.

The other upright edge of the plate 33 may be provided with a flange 38 to fit against the engine block. Journaled in the bearing 34 is an upright rod 39 having at its lower end the right-angled extension 40 and at its upper end the right-angled extension 41. The extension 40 is provided with an eye 42, which receives the downturned end 43 at the forward part of the rod 32.

The arm 41 has pivoted to it a stiff wire or rod 44, one end of which is pivoted on the set screw 31. Secured to the arm 44 is a coil spring 45.

Slidably mounted on the rod 28 between the stops formed by the cotter pin 29 and the collar 30 is an eyelet 46, having a cylindrical extension 47 formed thereon. The cylindrical extension 47 is pivotally extended through the arm 27 hereinbefore referred to, and the coil spring 45 is connected with the cylindrical extension 47.

In the actual use of the foot feed control and the hand throttle control, the parts are so constructed and arranged that if it be assumed that the throttle valve is closed, then if the hand throttle lever is actuated for rotating the hand throttle rod 20, then the arm 27 will acuate the eyelet 46 for causing it to engage against the collar 30 for pushing the rod 28 longitudinally toward the right side of the car for actuating the lever 25 and thus opening the throttle valve.

The rod or wire 44, the rod 39 and the foot actuated rod 32 move freely with the rod 28 and do not interfere with the hand control.

If it is desired to then close the throttle, the hand throttle lever, not shown, is moved in the opposite direction from that of its first movement, thus reversally rotating the hand throttle 20 for returning the rod 28 and the throttle valve toward their original positions.

Assuming that the throttle valve is closed and that it is desired to actuate it toward opening position by means of the foot feed control, the operator presses on the head 32ª with his foot, thus moving the rod 32 forwardly in the car, and rotating the upright rod 39, whereupon the rod 44 pulls the collar 30 and the rod 28 toward throttle opening position.

In actual practice, the hand throttle lever is mounted adjacent to a notched or corrugated sector and is held against the sector with some tension. On account of this fact, when the foot feed control is actuated for opening the throttle, the eyelet 46 is held by the hand control mechanism, including the rod 20, and the hand lever and sector, not shown, and this holding stretches and tensions the spring 45, so that when the foot pressure on the head 33 is relieved, the spring 45 will move the rod 44 for operating the rod 28 toward throttle closing position.

This is a very simple and effective mechanism for accomplishing the purpose, and it is to be noted that the foot control mechanism is mounted on the left side of the engine. Usually the mechanism is mounted on the other side of the engine, although not always.

Many foot accelerators are of the type which include a spring for imposing tension on the parts for constraining them toward throttle closing position.

Such structure has a disadvantage in that when the hand throttle control mechanism is operated for opening the throttle, the tension on such a spring is increased and in driving over rough roads, the vibration may relieve the frictional gripping between the hand throttle lever and its sector, and thereupon the spring mentioned will tend to move the throttle toward closed position, moving with it the hand throttle lever toward throttle closing position. This is, of course, undesirable.

It will be noted that with my foot feed control attachment herein described, the construction and arrangement of the parts are such that the actuation of the throttle toward open position by the hand throttle mechanism does not in any way increase the tension on the spring, nor is there any tension on the spring tending to close the throttle. There is therefore no danger of the hand throttle mechanism being accidentally moved toward throttle closing position. This I believe to be a novel feature of structure in devices of this kind.

Changes may be made in the details of the structure and arrangement of the parts of my improved device without departing from the real spirit and purpose of my invention, and it is my intention to cover by my claims, any modified forms of structure or use of mechanical equivalents, which may be included within their scope.

It is not my intention to limit myself to the particular type of foot actuated means for actuating the rod 44 nor the particular supporting bracket plate 33, nor to other details of mechanism, except as specifically set forth in my claims, and it is my intention to cover even by my claims any proper equivalent structures.

I claim as my invention:

1. In a fuel control structure for motor vehicles, a throttle actuating rod, a stop thereon, a foot actuatable operating device, a rod pivoted thereto and to said first rod, a member slidably mounted on the first rod, and a spring connecting said foot actuatable device and said member and tending to hold the member and the stop together.

2. In a fuel control structure for motor vehicles, a throttle actuating rod, a stop thereon, a foot actuatable device mounted for swinging movement, a rod connecting said device and said first rod, a member slidably mounted on said first rod, and a spring connecting said device and said member and tending to hold the member and the stop together.

3. In a fuel control structure for motor vehicles, a throttle actuating rod, a stop thereon, a foot actuatable device mounted for swinging movement, a rod connecting said device and said first rod, a member slidably mounted on said first rod, and a spring connecting said device and said member and tending to hold the member and the stop together, said device comprising an upright rod having angular extensions at its ends, a bracket having an upright bearing for said last-named rod, and a fourth rod pivoted to one of the ends of said third rod.

4. The combination of a foot accelerator control rod having an arm thereon and a throttle control lever with a throttle actuated rod pivoted to said lever, a member slidably mounted on said throttle actuating rod, stops on the throttle actuating rod for limiting the sliding movement of said member on the throttle actuating rod, a foot actuatable device mounted for swinging movement, a third rod pivoted to said device and to said throttle actuating rod, a tension spring interposed between said device and said slidable member, the arm on said hand throttle control rod having a pivotal connection with said slidable member.

WALTER H. THOMAS.